United States Patent
Stepanova et al.

(10) Patent No.: US 11,985,421 B2
(45) Date of Patent: May 14, 2024

(54) DEVICE AND METHOD FOR PREDICTED AUTOFOCUS ON AN OBJECT

(71) Applicant: Samsung Electronics Co., Ltd., Suwon-si (KR)

(72) Inventors: Liubov Vladimirovna Stepanova, Angarsk (RU); Vladimir Petrovich Bogachev, Moscow (RU); Maxim Alexeevich Shikunov, Povarovo (RU); Aleksandr Aleksandrovich Khakhmovich, Moscow (RU); Petr Pohl, Lobnya (RU); Kira Sergeevna Kirillova, Ozyory (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 17/964,449

(22) Filed: Oct. 12, 2022

(65) Prior Publication Data
US 2023/0114785 A1     Apr. 13, 2023

Related U.S. Application Data

(63) Continuation of application No. PCT/KR2022/015282, filed on Oct. 11, 2022.

(30) Foreign Application Priority Data

Oct. 12, 2021 (RU) .......................... RU2021129695

(51) Int. Cl.
*H04N 23/67* (2023.01)
*H04N 13/128* (2018.01)
(Continued)

(52) U.S. Cl.
CPC ......... *H04N 23/675* (2023.01); *H04N 13/128* (2018.05); *H04N 13/239* (2018.05); *H04N 13/296* (2018.05); *H04N 23/672* (2023.01)

(58) Field of Classification Search
CPC .. H04N 23/675; H04N 13/128; H04N 13/239; H04N 13/296; H04N 23/672; H04N 23/617; H04N 23/61; H04N 23/67
(Continued)

(56) References Cited

U.S. PATENT DOCUMENTS 5,051,751 A   9/1991 Gray
7,423,686 B2  9/2008 Yamashita
(Continued)

FOREIGN PATENT DOCUMENTS

EP       1 703 723 A2   9/2006
KR   10-2009-0057443 A  6/2009
(Continued)

OTHER PUBLICATIONS

Q. Li, et al., "Kalman Filter and Its Application", 2015 8th International Conference on Intelligent Networks and Intelligent Systems (ICINIS), 2015.
(Continued)

*Primary Examiner* — Susan E. Torgerson
(74) *Attorney, Agent, or Firm* — Jefferson IP Law, LLP

(57) ABSTRACT

A method and device for predictive autofocus on an object are provided. The method includes capturing an image of a target object to be tracked by a user of camera of a device, selecting a region of interest (ROI) corresponding to a target point of the captured image of the target object, initializing a target object tracker via input of the selected ROI at i-th frame, where i=1, updating the target object tracker based on data at previous (i−1)th frame for i-th frame, where i>1, determining current camera lens position for the tracked target object at current frame, when the target object is out of the camera focus, determining disparity for the selected ROI at i-th frame from previously collected data defining dependence of distance between the target object and lens
(Continued)

surface on the camera lens position, determining delta lens position to focus the camera on the target object as a function of disparity and current lens position or target object position in the frame by a computing unit, calculating predicted target object position and delta lens position for N future frames from coordinates of current ROI and current delta lens position, and providing predicted autofocus in real time.

20 Claims, 10 Drawing Sheets

(51) Int. Cl.
*H04N 13/239* (2018.01)
*H04N 13/296* (2018.01)

(58) Field of Classification Search
USPC .......................................................... 348/47
See application file for complete search history.

(56) References Cited

U.S. PATENT DOCUMENTS

| | | | |
|---|---|---|---|
| 7,835,637 B2 | 11/2010 | Li et al. | |
| 7,936,987 B2 | 5/2011 | Park et al. | |
| 8,682,155 B2 * | 3/2014 | Suzuki ................ | H04N 23/67 396/153 |
| 8,941,722 B2 | 1/2015 | Aronsson et al. | |
| 9,818,202 B2 | 11/2017 | Masuda | |
| 9,883,097 B2 | 1/2018 | Cardei et al. | |
| 9,936,126 B2 | 4/2018 | Leu | |
| 10,061,182 B2 * | 8/2018 | Dayana ............... | H04N 23/959 |
| 10,129,456 B1 | 11/2018 | Kim | |
| 10,187,564 B2 | 1/2019 | Omata et al. | |
| 10,455,141 B2 | 10/2019 | Du et al. | |
| 2008/0266440 A1 | 10/2008 | Yazdanfar et al. | |
| 2017/0064197 A1 | 3/2017 | Leu | |
| 2017/0277018 A1 | 9/2017 | Dayana et al. | |
| 2019/0379819 A1 | 12/2019 | Shimada | |
| 2020/0124940 A1 | 4/2020 | Shimada | |
| 2020/0265603 A1 | 8/2020 | Yim et al. | |

FOREIGN PATENT DOCUMENTS

| | | |
|---|---|---|
| KR | 10-1909022 B1 | 10/2018 |
| KR | 10-2020-0100498 A | 8/2020 |
| WO | 2010/120231 A1 | 10/2010 |

OTHER PUBLICATIONS

S. Mukherjee et al., "A hybrid algorithm for disparity calculation from sparse disparity estimates based on stereo vision" in Proceedings of IEEE International Conference on Signal Processing and Communications (SPCOM), (IEEE, 2014.
International Search Report and written opinion dated Jan. 18, 2023, issued in International Application No. PCT/KR2022/015282.
Li et al., "Kalman Filter and Its Application," 2015 8th International Conference on Intelligent Networks and Intelligent Systems (ICINIS), 2015.
Kalman, "A New Approach to Linear Filtering and Prediction Problems," Transactions of the ASME—Journal of Basic Engineering 82, Series D (1960), pp. 35-45.
Bishop, "Pattern Recognition and Machine Learning," Springer, ISBN 978-0-387-31073-2, 2006.
Mitchell, "Machine Learning." McGraw Hill. p. 2. ISBN 978-0-07-042807-2, 2007.
Russell et al., Artificial Intelligence: A Modern Approach (2nd ed.). Prentice Hall. ISBN 978-0137903955. 2003, 1995.
Raajan et al., "Disparity estimation from stereo images. In: International conference on modeling optimization and computing," Springer, vol. 38, pp. 462-472. (2012).
Mukherjee et al., "A hybrid algorithm for disparity calculation from sparse disparity estimates based on stereo vision," Proceedings of IEEE International Conference on Signal Processing and Communications (SPCOM), (IEEE, 2014).
Lukeěič et al., "Discriminative Correlation Filter with Channel and Spatial Reliability." Proceedings of the IEEE Conference on Computer Vision and Pattern Recognition (CVPR), 2017. Section 3.2.
Dalal et al., "Histograms of oriented gradients for human detection," 2005 IEEE computer society conference on computer vision and pattern recognition (CVPR'05), Jun. 2005.
Cooley et al., "An algorithm for the machine calculation of complex Fourier series," Mathematics of computation, vol. 19, No. 90 (Apr. 1965).
Decision to Grant dated Jun. 15, 2022, issued in Russian Application No. 2021129695/43(062979).
International Search Report dated Jun. 15, 2022, issued in Russian Application No. 2021129695/28(062979).

* cited by examiner

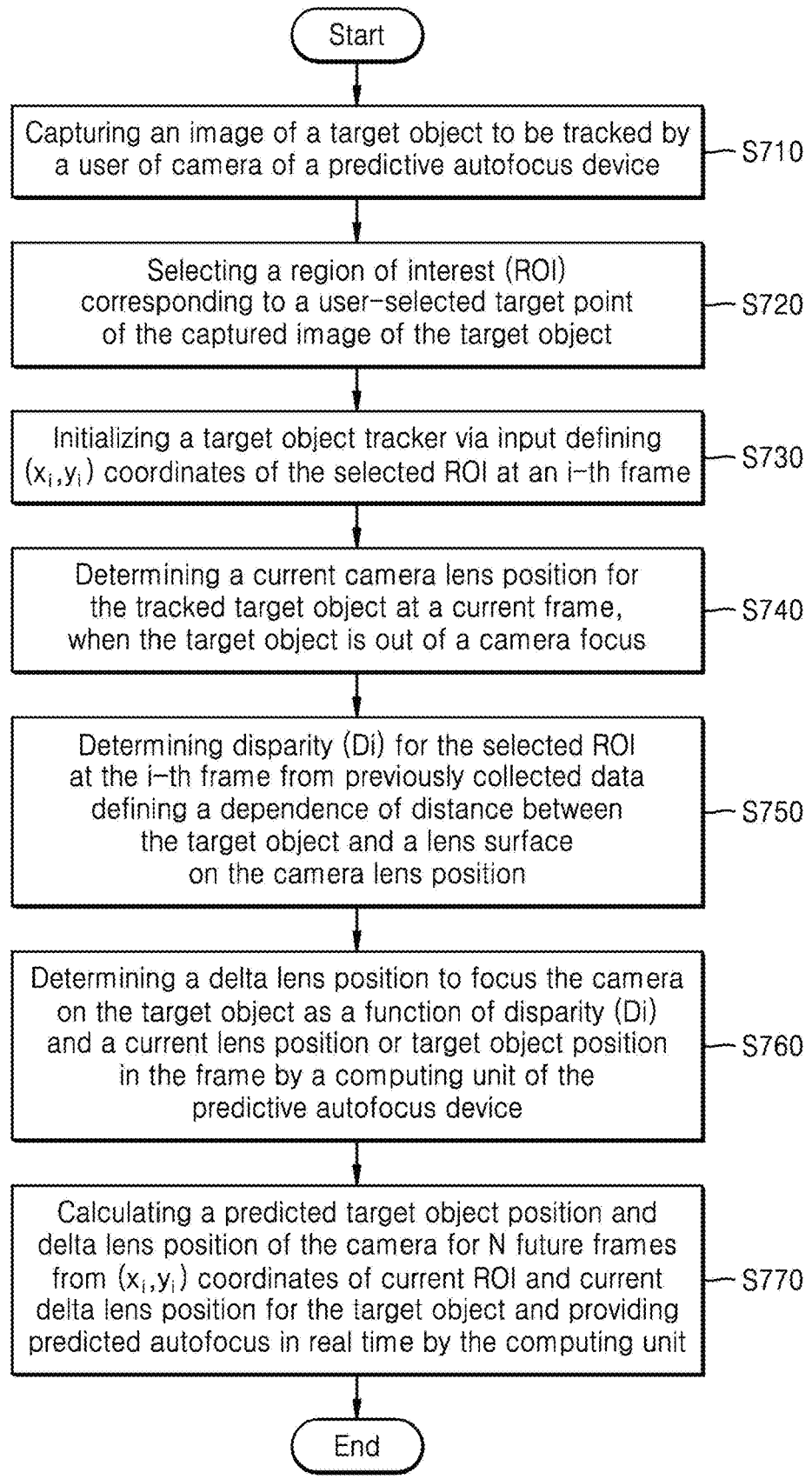

DEVICE AND METHOD FOR PREDICTED AUTOFOCUS ON AN OBJECT

CROSS-REFERENCE TO RELATED APPLICATION(S)

This application is a continuation application, claiming priority under § 365(c), of an International application No. PCT/KR2022/015282, filed on Oct. 11, 2022, which is based on and claims the benefit of a Russian patent application number 2021129695, filed on Oct. 12, 2021, in the Russian Intellectual Property Office, the disclosure of which is incorporated by reference herein in its entirety.

TECHNICAL FIELD

The disclosure relates to methods and devices for predictive autofocus on an object on a camera. More particularly, the disclosure relates to predicting autofocus on an object, and can be used, in particular, for photo and video shooting with smartphone cameras, and also in tablet computers running Android, iOS, HarmonyOS and similar systems, as well as in other similar devices which need predicted autofocus.

BACKGROUND ART

Currently, major manufacturers of photo and video facilities use a variety of auto-focusing methods. The methods include phase detection autofocus method relying on detecting light, which is split into two or more beams propagating toward the camera, by spaced apart image sensors, and using signals from the image sensors to move lenses in the objective by a predetermined amount for focusing the image, stereo autofocus method comprising forming two images by two cameras for left and right eye, which are superimposed on each other, and adjusting focus based on the parallax between the resulting images, contrast autofocus method comprising determining sharpness in a certain area of formed image using a matrix of sensors incorporated into the camera as such. If a certain area in the image is not sharp, the autofocus system adjusts the objective (lens) until sharpness/contrast is achieved, dynamic (tracking) autofocus method, which enables shooting scenes with a large number of objects moving relative to each other, e.g., sporting events. In this mode, camera estimates how the objects in the frame are related and draw a map.

Furthermore, various lens adjustment methods are used for autofocus, continuous autofocus, where lens position is adjusted step-by-step to focus on an object, time-delayed predictive autofocus, where lens position is predicted, but video display on the screen is delayed as compared to the actual lens position, and the delay between current lens position and predicted lens position is used for more accurate calculation of lens position, and fixed autofocus, where lens position is fixed and user selects an object of interest manually or automatically.

Some advanced focusing methods take time to process data, so they don't work in real time, and the delay might be significant (up to seconds). Current autofocus methods do not predict lens position or only predict it for the next frame, which prevents focus transition from being smooth and makes video quality worse. Continuous autofocus methods often fail when it comes to focusing on fast moving objects.

Aspects of the disclosure is to provide a method and device for predictive autofocus on an object, involving tracking current position of an object in real time, and, based on the defined object position, predicting object position for future frames and, accordingly, depending on the predicted object position, predicting change in lens position (necessary lens movement so object is in focus) for future frames to decrease autofocus delay and to provide more stable focusing in corner cases.

Furthermore, the present method and device overcome drawbacks of conventional autofocus method, such as the following.

Delayed autofocus, caused by the fact that autofocus devices are unable to work in real time as it takes time to process data. The delay might be significant (up to several seconds) and lead to inaccurate adjustment of the lens position.

Discontinuous focus transition, which means that current autofocus methods do not predict lens position or only predict it for the next frame, thereby preventing focus transition from being smooth and making quality of the resulting photo/video worse.

Out-of-focus shots in corner cases. Partial occlusions create depth irregularities, reducing accuracy of auto-focusing, while object and background overlapping for an instant may lead to losing focus on the object. Low-light conditions also worsen the autofocus quality.

Out-of-focus shots during fast or complex movement of object(s). Continuous autofocus methods often fail when it comes to focusing on fast moving objects, which leads to poor photo/video quality.

One related art example discloses an optical flow-based auto-focusing method comprising identifying a set of features of an object, the features being tracked in an image captured by a camera. The method also includes creating a field of vectors for reference points. The vectors indicate magnitude and direction of change in position of the reference points across more than one frame of the image. The method further includes identifying existence of out of plane movement of the object's features from the same radial orientation of the vectors. The method further includes determining an amount of closer/farther movement of the object's features to/from the camera from change in the distances between a plurality of the reference points. The method further includes adjusting a position of camera's lens in view of the amount of closer/farther movement of the object's features to keep the camera focused on the object.

The method does not predict position of the object in future frames, i.e., does not relate to predictive autofocus methods.

Another related art example discloses an autofocus method including, at the same moment, collecting a first image of a first object using a first image shooting unit (camera), collecting a second image of a first object using a second image shooting unit (camera), calculating M pieces of the first depth information of M same feature points pairs in corresponding areas in the first image and the second image, determining whether the confidence of the M pieces of the first depth information is greater than a threshold, obtaining focusing depth information according to N pieces of first depth information in the IM pieces of first depth information when the confidence of the M pieces of the first depth information is greater than the threshold, obtaining a target position of the first lens of the first image shooting unit according to the focusing depth information, and controlling the first lens to move to the target position. The method requires adjustment of two image shooting devices, which complicates its implementation and requires a trade-off between speed and accuracy. In addition, the method does not predict position of the object in future frames, i.e., it is not predictive.

Another related art example discloses an autofocus method of face detection camera and an apparatus for controlling the camera, wherein position of the camera lens is adjusted using an actuator, an image data captured using the lens is analyzed, and detection signal obtained from the data indicates whether a face is detected based on the analysis result, then size of the face is calculated, and a start lens position is determined based on the face size, and lens focus position is sought based on its start position. The camera controller includes an actuator controlling lens position, a face detector configured to receive and analyze an image captured using the lens, to generate a face detection signal, a lens movement range finder configured to determine a start lens position based on the face size, and an autofocus calculator configured to generate a lens position control signal based on the start lens position and output the signal to the camera module to adjust the lens focus. The method does not predict object position in future frames, i.e., it is not predictive, in addition, the face detection technique provided in this method imposes certain restrictions on the ability to be used in autofocus on objects.

Another related art method and system for providing focus control for an image capturing device comprises capturing an image frame using an image capturing device, and recording video tracking data and gaze tracking data for one or more image frames following the captured image frame or for one or more image frames prior to the captured image frame. The method further includes calculating a focus distance and a depth of field based at least partially on the recorded video tracking data and the recorded gaze tracking data. The method further includes displaying the captured image frame based on the calculated focus distance and the calculated depth of field. Drawbacks of the method is the delay between the recorded video and displayed video, which leads to time lag required to process data, resulting in an inaccurate adjustment of lens position.

None of the above disclosures meet current demands dictated by electronic portable devices with incorporated video/photo cameras. Furthermore, this is a challenging task in existing electronic devices to meet the requirement for small size so that it can be used on mobile phones and simultaneously maintain quality of image captured in real time, which is provided by predicting position of moving object/objects in two or more frames ahead.

To make advantages of the present predicted autofocus method and device more explicit, capabilities of the disclosure are hereinafter compared with the prior art disclosures described above.

The disclosure_1) predicts lens position for N future frames, 2) only requires data from current frame for lens position prediction, 3) number of use cases (estimations of lens positions in following frames) is not limited, 4) works in real time with zero delay, 5) one dual pixel camera is sufficient to ensure predicted autofocus.

A related art example 1) optionally, predicts lens position for one frame ahead, 2) requires data from previous and future frame to display current frame, 3) number of use cases (estimations of lens positions in following frames) is not limited, 4) significant delay (up to seconds) to process video data, 5) utilizes one traditional camera to predict lens position for one frame ahead.

Another related art example 1) does not predict lens position for frames ahead, 2) requires stereo data from current frame for lens position estimation, 3) number of use cases (estimations of lens positions in following frames) is not limited, 4) uses two types of focusing, active (instant) focusing works in real time, and passive (step-by-step) focusing which is more time-consuming, 5) utilizes at least two cameras to estimate lens position, which significantly raises the cost of final product.

Another related art example 1) does not predict lens position for future frames, 2) requires specific data (face detection) for current frame for estimation of lens position, 3) use of face detection as an important part of the lens position estimation process limits the number of use cases (estimations of lens positions in following frames) from receiving input to output of result, 4) uses series of checks before lens position search start, which might be time-consuming, 5) utilizes one traditional camera to determine lens position.

Referring now to FIGS. 1A and 1B, advantages of the disclosure will be clearly illustrated.

FIG. 1A shows frames with conventional autofocus on a moving object, such as a cat, indoors according to the related art. While the cat image is in focus in the first frame, focusing on the object as the cat is moving occurs with a delay, so focus is on the cat's tail or the cat is out of the image frame.

However, in FIG. 1B, showing frames obtained by the present method of predicted autofocus on an object, all images of the cat, irrespective of being in rest or moving around the room, are in focus according to the related art.

Therefore, the present device and method for predicted autofocus on an object provide more accurate autofocus on an object in real time.

No prior art is able to track the object and focus on it in real time, some of these disclosures exploit the time lag between capturing an image and displaying it on the screen, while the others do not consider this additional information at all. The disclosure eliminates this time lag by adding the object position prediction step.

The above information is presented as background information only to assist with an understanding of the disclosure. No determination has been made, and no assertion is made, as to whether any of the above might be applicable as prior art with regard to the disclosure.

SUMMARY OF THE INVENTION

Aspects of the disclosure are to address at least the above-mentioned problems and/or disadvantages and to provide at least the advantages described below. Accordingly, an aspect of the disclosure is to provide a method and device for predictive autofocus on an object, involving tracking current position of an object in real time, and, based on the defined object position, predicting object position for future frames and, accordingly, depending on the predicted object position, predicting change in lens position (necessary lens movement so object is in focus) for future frames to decrease autofocus delay and to provide more stable focusing in corner cases.

Additional aspects will be set forth in part in the description which follows and, in part, will be apparent from the description, or may be learned by practice of the presented embodiments.

In accordance with an aspect of the disclosure, a method of predictive autofocus on an object is provided. The method comprises capturing an image of a target object to be tracked by a user of camera of a predictive autofocus device. The method comprises selecting a region of interest (ROI) corresponding to a user-selected target point of the captured image of the target object. The method comprises initializing a target object tracker via input defining $(x_i, y_i)$ coordinates of the selected ROI at i-th frame, where i=1, and updating the target object tracker based on data received at the tracker at previous (i−1)th frame for i-th frame, where i>1. The method comprises determining current camera lens position for the tracked target object at current frame, when the target object is out of the camera focus The method comprises determining disparity (Di) for the selected ROI at i-th frame from previously collected data defining the dependence of distance between the target object and the lens surface on the camera lens position The method comprises determining delta lens position to focus the camera on the target object as a function of disparity (Di) and current lens position or target object position in the frame by a computing unit of the predictive autofocus device The method comprises calculating predicted target object position and delta lens position for N future frames from $(x_i, y_i)$ coordinates of current ROI and current delta lens position for the target object and providing predicted autofocus in real time by the computing unit.

In accordance with another aspect of the disclosure, a device for predictive autofocus on an object, operable to perform the method steps disclosed above according to the first aspect of the disclosure is provided. The device comprises an input/output (I/O) unit including a graphics processing unit, a display, a camera, and interfaces. The device comprises a computing unit including a central processor, a controller, a memory, a system memory and storage. The camera comprises a matrix of sensors and is configured to capture a target object and transfer image data of the target object to the system memory of the computing unit via the I/O interface. The computing unit is configured to calculate target object position and delta lens position of the camera predicted for N future frames, the resulting target object position being transferred to the system memory and via the I/O interface to the camera for auto-focusing. The camera is configured to transfer graphic information based on calculated data of the predicted target object position via the I/O interface and the graphics processing unit to the device display. The device display is configured to render the target object being in focus in real time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a flow diagram of the predicted autofocus method according to an embodiment of the disclosure.

Throughout the drawings, it should be noted that like reference numbers are used to depict the same or similar elements, features, and structures.

DESCRIPTION OF PREFERRED EMBODIMENTS

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Notions and terms used within the scope of the disclosure are defined as follows:

Target object is an object selected by the user to autofocus on.

User selected area is an area on the device screen, selected by the user as containing the object to focus on. The area can be selected with single tapping the screen with user's finger or in any possible way.

Region of interest (ROI) refers to a specific region on the device screen, selected using "grid" option in photo and video shooting app provided in modern smartphones on Android, iOS, etc. For example, a device screen can be divided into several equal or unequal rectangles or other figures that form a grid. One cell or rectangle of the grid, selected by the user, is referred to as region of interest (ROI). As an example, the inventors considered a screen divided into equal rectangles forming 9×13 grid, but this example is not limiting. In this case, there are 9×13 ROIs on the screen.

Selected region of interest (selected ROI) is the region of interest defined based on the area selected by the user, which may contain center of the user-selected region, major part of it, or the entire user-selected area, depending on user's requirements when auto-focusing on the object.

Figure 2:
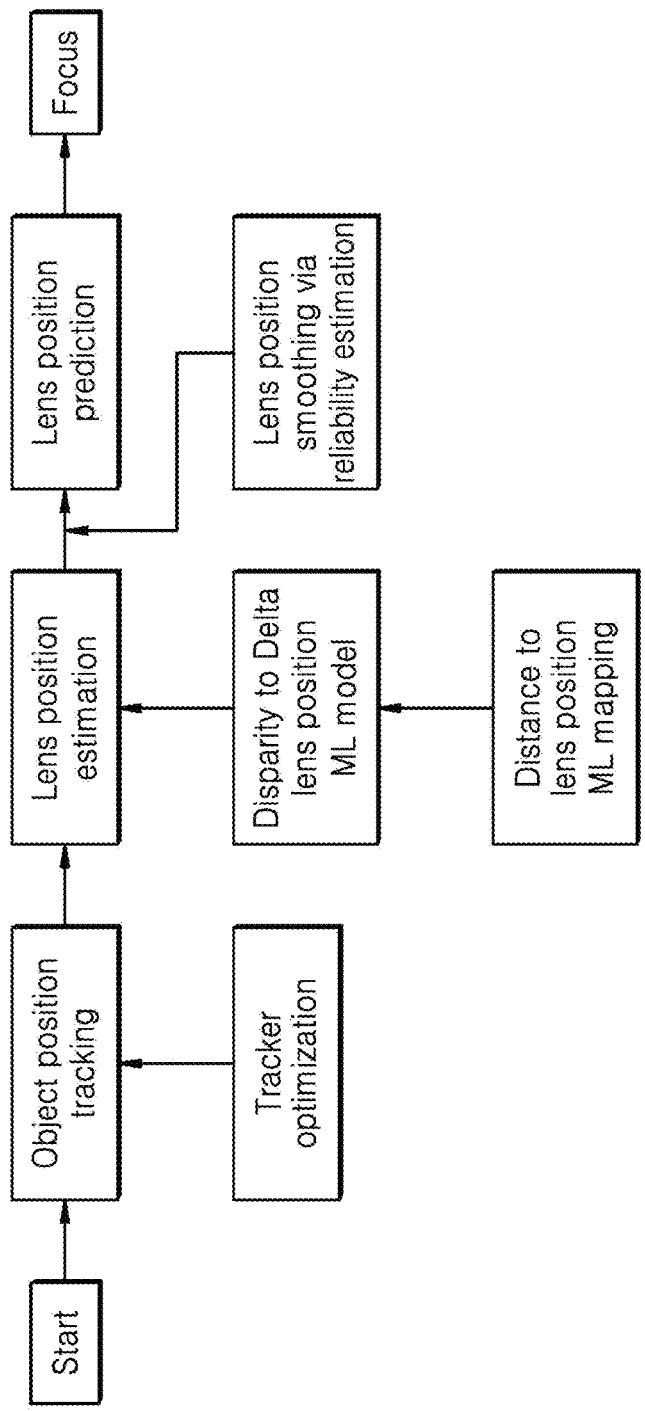
FIG. 2 is a flow diagram of pipeline of the predicted autofocus method according to an embodiment of the disclosure.

FIG. 2 shows a selected ROI. Selected ROI and its coordinates are considered as input to start the autofocus prediction process.

Current region of interest (current ROI) implies that on the first frame, current ROI corresponds to selected ROI, but on the following frames, current ROI is the region of interest, which returns tracking algorithm for the current frame. User selects ROI only for the first time. It should be noted that each frame is conditionally divided into ROI grid, for example, 13×9; in the first iteration ROI is selected through user's input (conditionally, user shows where the object of interest is located), then this information is transferred to a tracking means (tracker), and it is predicted for each subsequent frame, in which ROI of the grid the target object will be located.

Tracker (algorithm) is a data processing pipeline, which, based on input such as data of current ROI with the object to autofocus on, outputs data (coordinates and depth) of the object in the following frames.

Phase detection autofocus (PDAF) data refers to the images obtained when light rays are reflected from an object in the frame and incident on opposite (left and right) sides of the camera lens. The object is in focus when the two obtained images match. Images obtained in this way are also referred to as left and right image, respectively.

Dual Pixel refers to phase autofocus technique that uses each pixel in the sensor to detect phase and get color information, which significantly increases autofocus speed and accuracy over conventional systems.

A sum of absolute distances (SAD) curve refers to a curve on a 2-dimentional (2D) graph: X-axis corresponds to the shift in the number of pixels of left image relative to the right one; Y-axis corresponds to sum of pixel-by-pixel differences between images for selected fragment; according to the disclosure, SAD curves are obtained by sensors incorporated in a mobile phone, which are referred to "dual pixels" and contain information about two pictures (left and right image of the object from the phone with a slight shift).

Disparity (mismatch) is a measurement of scene defocusing, obtained from SAD curve analysis. Formally, disparity is the point of local minimum of SAD curve, so it is measured in the number of pixels.

True lens position refers to lens position in the device camera, at which the target object in the frame is in focus.

By way of example and not limitation, prediction method can be a classical (basic) Kalman filter. Kalman filter uses a series of measurements for efficient estimation of the state of the system and further prediction via extrapolation. In the disclosure, the measurement is lens position.

Kalman filter prediction methods are described in the related art literature.

Alternative prediction methods include moving average method, particle filter, autoregressive-moving average model and other similar methods, as well as any machine learning algorithms for solving the regression reconstruction problem.

Machine learning method for obtaining true lens position is any machine learning algorithm solving the regression reconstruction problem, which can restore lens position corresponding to the object being in focus from input (distance of the object to the camera lens surface).

Machine learning method for obtaining delta lens position is any machine learning algorithm solving the regression reconstruction problem, which can restore from input (scene defocusing measurement) the shift of lens from its current position to the position corresponding to the object in focus.

Basic concepts of machine learning are also described in the related art literature.

Stereo Matching refers to calculating position of a point in three-dimensional space based on two images of the same scene, obtained from different angles of view (referred to as stereo pair).

FIG. 2 shows a flow diagram of a pipeline of autofocus prediction on an object, including the key steps: automatically tracking an object to autofocus on, determining current lens position, and predicting future lens position, i.e., lens position over several frames ahead according to an embodiment of the disclosure.

In the following, the pipeline for autofocus on an object will be disclosed in more detail with reference to FIG. 2:

1. Start
  a) selecting an object to focus on. User selects an object by tapping the screen of a predictive autofocus device (hereinafter referred to as device) in the photo and video shooting app, to set an area of interest, which is referred to as user's area of interest.
  b) identifying ROI. User sets a certain area on the device screen, selected e.g., through "grid" option in photo and video shooting app provided in modern smartphones, tablets running Android, iOS, etc., or in any other conventional way. The device screen can be divided into several equal or unequal rectangles or other figures to form a grid. One cell or rectangle of this grid, selected by the user, is referred to as region of interest (ROI). When tapping the screen, i.e., the area of user's interest, the user is interested which region of interest includes center of the area tapped by the user on the screen. This particular region is considered as selected region of interest (selected ROI).

2. Tracking object position
  a) selected ROI is used to initiate tracking process, i.e., (x,y) coordinate data of selected ROI is input to tracker.

3. Estimating lens position
  a) delta lens position is calculated for selected ROI and is used to obtain the lens position at which the object in current frame is in focus. In particular, in case of PDAF input, delta lens position is estimated via disparity, which is calculated from SAD (sum of absolute differences) curves between left and right images provided for the selected region of interest.
  b) for accurate calculation of delta lens position, a machine learning model trained on disparity and delta lens position data is used (machine learning model and data collection method will be further described in more detail).
  c) for obtaining delta lens position, data on the scene depth (physical distance to the object) is required, which can be obtained using other methods (PDAF, Stereo Reconstruction, etc.) as well.

Estimation of disparity via stereo reconstruction is also described in the related art literature.

4. Predicting lens position and target object position
  a) selected region of interest and calculated delta lens position are considered as input to prediction step.
  b) prediction step predicts object position and lens position on future frames using current region of interest obtained in the tracking step, and the calculated delta lens position for current region of interest in each frame.

In the following, a preferred embodiment of the predictive autofocus method will be described taking into account basic provisions of the method for predictive autofocus on an object on camera, disclosed with reference to FIG. 2.

A method for providing focus control on an object on camera comprises the following steps:

selecting an object of interest, which is in the field of view of camera of the predictive autofocus device, fully or partly by the device user. The user marks a target point that matches the position of user-selected POI. The user-selected target point can be marked by simply tapping on the screen and, depending on capabilities of the screen sensor of the device and functions of the processing unit incorporated in the device, which processes data from the touch sensor disposed under the screen, it can be determined as a direct tap processing result or calculated as geometric center of the area tapped with user's finger. Selected region of interest to initiate the tracking process is the region of interest from the grid of regions of interest, which includes the user-selected target point.

tracking the object to be focused on; for this, the selected region of interest is considered as input to the trackers;

calculating delta lens position (lens Δ), i.e., the amount and direction of lens shift, to ensure focus on the object of interest. Calculation of delta lens position will be described in detail hereinafter. It should be noted that delta lens position is calculated from data including disparity and, optionally, current lens position or object position in the frame (current region of interest).

Delta lens position calculation algorithm is a machine learning model which is pre-trained on a labeled dataset matching the disparity and delta lens position listed above and predicts delta lens position based on this data.

calculating predicted object position and delta lens position for N future frames using current region of interest and current delta lens position for tracked object, where N≥1;

resulting delta lens position is used further to provide, at each frame, lens shift in desired direction by required amount so that the current lens position becomes optimal, that is, at the current lens position, focusing on the object is performed.

Estimation of lens position via disparity and reliability will be described with reference to the flow diagram in FIG. 2, where boxes 5, 6 and 7 stand for the following blocks: disparity-to-delta lens position mapping machine learning (ML) model, physical distance-to-lens position mapping ML model, and lens position smoothing via reliability estimation.

A) Correction of Disparity for Lens Position Estimation

5. Physical distance-to-lens position mapping ML model (see FIG. 2)

a) preparation and collection of data defining physical distance from target object to lens surface and its correspondence to lens position, which are performed preliminarily by a data collection module comprising a set of cameras remote from the predicted autofocus device at different distances from the object and determining or measuring exact distance from the target object to respective camera. Obtained experimental data was used by the inventors to tune the machine learning algorithm used to predict target object position.

b) pre-training the machine learning model on the collected data obtained previously from a series of experiments using a set of cameras of a data collecting unit to map physical distance to lens position and store the model in the device memory.

It should be noted that after incorporating the machine learning model into the predictive autofocus device, lens position at which the target object will be in focus can be restored for a target object located at any distance from the camera.

6. Disparity-to-delta lens position mapping ML model (see FIG. 2)

Disparity is used in the disclosure to adjust changes in lens position.

a) preparation and collection of data for disparity-to-lens position mapping are performed preliminary using a set of cameras remote from the predictive autofocus device at different distances from the object and determining exact distance from the target object to respective camera. The ML used to predict the target object position was trained on experimental data obtained by the inventors. In this case, disparity is pre-calculated from SAD (sum of absolute differences) curves between left and right image for selected ROI, obtained with the camera of the predictive autofocus device.

b) output from the resulting model is delta lens position defined as the difference between fixed lens position and the position obtained for the distance determined in step 5.

The resulting ML models disclosed in items 5 and 6 are used to change current lens position to true lens position, i.e., the position where the target object is in focus.

7. Lens position smoothing via reliability estimation

Reliability is a measurement indicating the degree to which the obtained lens position is affected by noise, and therefore, can be depended on to be accurate. For example and not limitation, reliability can be estimated as the signal-to-noise ratio:

$$R = 100 \times Y_S/Y_N \qquad \text{Equation 1}$$

where R is reliability, $Y_S$ is the signal level, $Y_N$ is the noise level. Reliability can also be estimated with a machine learning model.

Figure 1A:
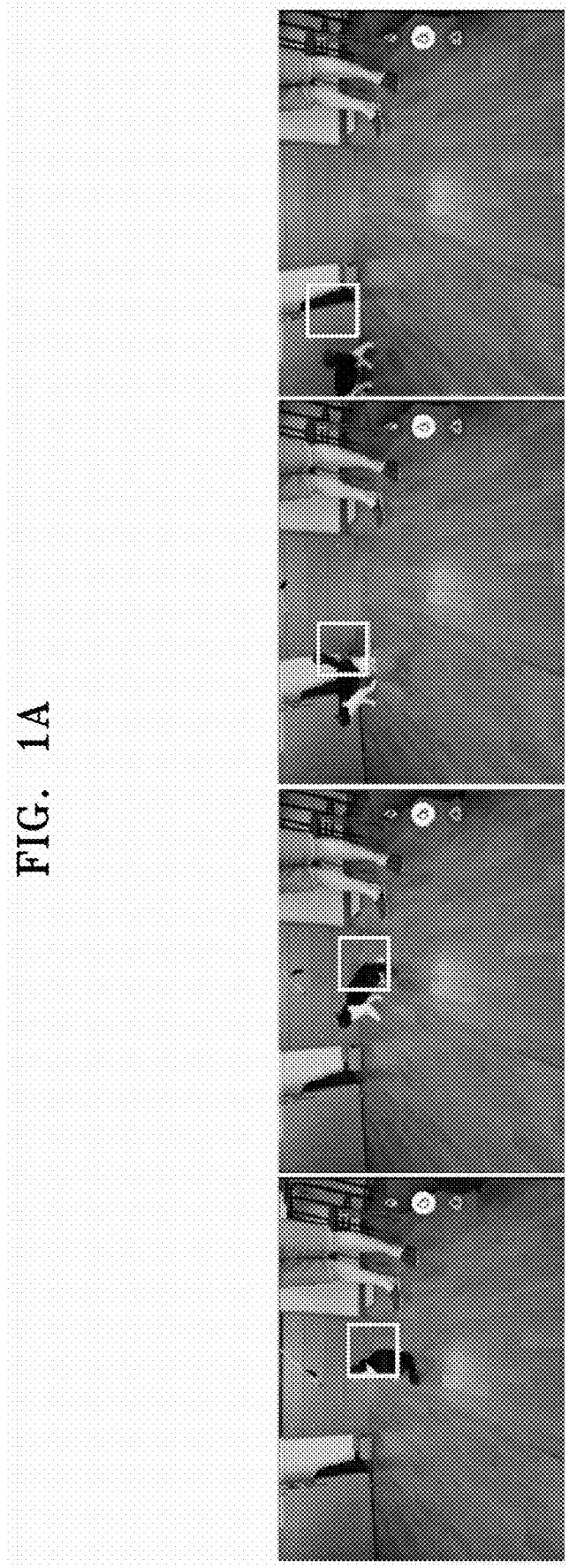
FIG. 1A shows a sequence of frames with autofocus on a moving object, such as a cat, indoors according to the related art.
Figure 1B:
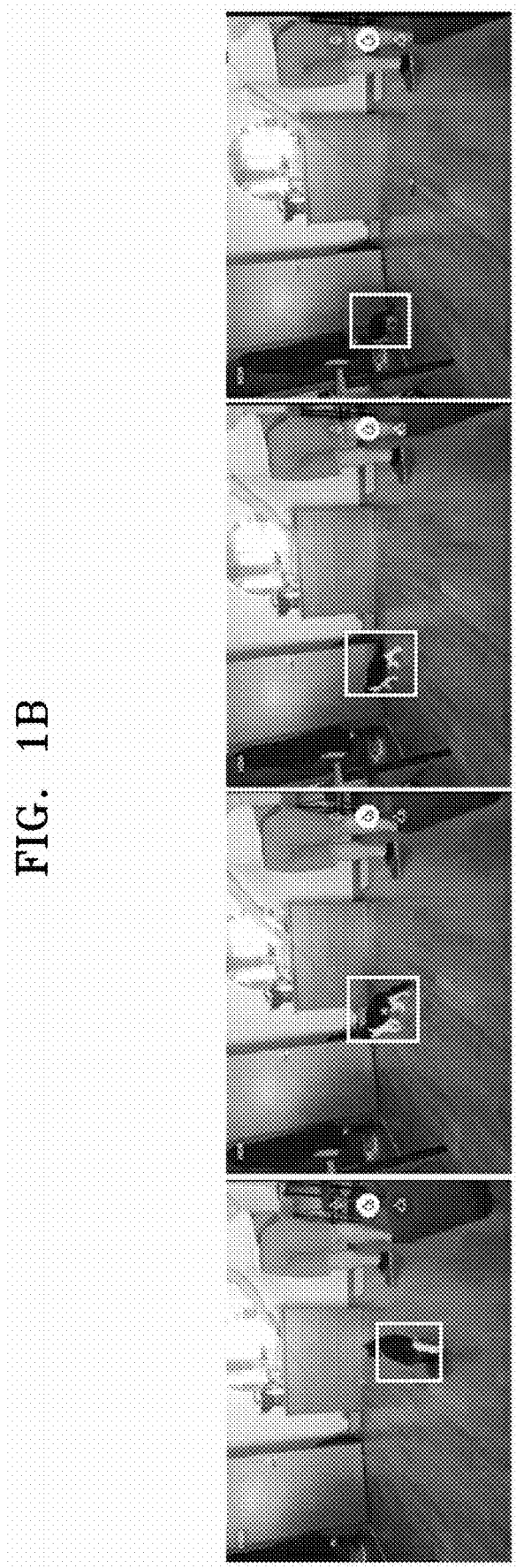
FIG. 1B shows a sequence of frames with predicted autofocus on a moving object, such as a cat, indoors according to the related art.

Therefore, the disclosure uses reliability estimation for smoothing lens position, which is clearly illustrated in FIG. 1B, showing several positions of the cat as it moves, and smooth transition of focus to the object of interest (cat).

8. Optimization of target object tracker

To describe tracker optimization steps, key tracking steps based on the use of correlation filters are to be disclosed.

Basic means for tracking changes in the position of a target point, for example, center of an object from frame to frame, is a correlation filter. Correlation filter is a matrix of the same size as the region of interest in the image. The filter is applied to specified pixel features of the ROI by finding correlation between them. Correlation can be formally defined as the result of applying the mathematical operation of convolution between two discrete functions in 2D space of pixel coordinates. The correlation result is a signal in the form of a matrix, also referred to a signal map, of the same size as the ROI; coordinates of maximum element in the matrix are taken as predicted center of the object at a new frame. Before applying in the above way, the filter must be calculated so that the correlation peak corresponds to the desired center of the object. For this, an image with a priori known location of the object center is used, for example, the first frame at the instant of tracker initialization by user's tap on the device screen. The correlation filter is calculated by minimizing the error function between the pixel-by-pixel correspondence of the signal map obtained from the filter with some initial values and the map of ideal signal modeled using known center coordinates. As a result, the calculated filter enables determining shift of the object center for newly obtained frame.

The tracker comprises a step of determining current region of interest size, which changes with the shape and position of the object relative to the camera. This step is also implemented via a correlation filter in a similar way: each coordinate in the signal map defines own size of the region of interest from a predetermined set of trial sizes, and optimal size is selected from the coordinate with maximum value.

Therefore, after initializing filters on the first frame, the tracker performs the following basic steps on the newly received frame:

1. Extracting pixel-wise (or block-wise if pixels are grouped into blocks) features from the region of interest;
2. Applying filter to determine the object center shift over the previous frame;
3. Applying filter to determine new region of interest size relative to new object center;
4. (optional) calculating new instances of both filters for obtained region of interest, combining with previous ones to adapt to changes in object/scene movement;

In the following, tracker optimization steps are described (with reference to steps 1 to 4 above). Optimization refers to improving the operation quality and increasing the tracker speed.

1) At step 1 of the tracker, pixels are grouped into rectangular blocks, and to reduce the amount of computations in subsequent steps, the matrix of blocks has a fixed size regardless of object size change during shooting. Region corresponding to the matrix of blocks in the image is the processing region, generally, of larger size than the region of interest.

2) When generating correlation filters, the family of algorithms often calculate, with correlation filters, masks which being superimposed on the region of interest cut off from consideration some pixel blocks, presumably not belonging to the object. In the tracker optimization, mask is not calculated; binary mask with value 1 is used by default at the positions corresponding to the region of interest within the processing region, otherwise mask with value 0 is used.

3) Features of a block of pixels include histogram of oriented gradients (HoG), which has long been used in image processing tasks. Within tracker optimization, the approach to its generation has been changed:

Histogram is generated on the basis of grayscale image representation instead of red-green-blue (RGB) to reduce the amount of computation.

Next value of gradient length for a certain position in the block does not fill the nearest predetermined direction (by degree) in the histogram, but is distributed between two neighbors in a size directly proportional to cosine of the angle between the neighbor and the gradient processed.

Obtained histogram values for a certain block are extrapolated to neighboring blocks in a size dependent, for each value, on the distance of corresponding pixel of the block to the neighboring block. Items 2 and 3 are aimed to form a smoother representation of the object movement from frame to frame.

4) Step 4 of tracker optimization involves generating new instances of corresponding filters not on every frame: the object center determining filter is calculated once in a series of N frames; the region of interest size determining filter is calculated once in a series of M frames. N and M are specified parametrically. By way of example and not limitation, both values can be 3. Thus, acceleration is achieved on average for a sequence of frames.

5) At step 4, the generated filters are each time combined with precedents in the previous frame according to the weighted arithmetic mean formula. Weight for the object center position determining filter is adaptive, i.e., may vary from frame to frame depending on the observed region of interest. Initially, weight ranging from 0 to 1 has a very small value, for example, 0.01. At the instant of a sharp change in the region of interest, which is recognized by the metric of the sum of absolute differences, the weight becomes 1.

6) Tracker optimization steps for computation on Android devices include accelerating the computation of point-wise multiplication of matrices with complex values, accelerating the Fourier transform operation. Acceleration is achieved both by the use of vector operations and by changing the computation method.

In following, tracker optimization steps will be described in more detail with reference to FIG. 5C.

Effects offered by the predictive autofocus method and device.

Overall effects:
real-time predictive autofocus on an object;
smooth focus transition due to higher predictive capacity.
Effects of full predictive pipeline from receiving input to output of result:
single pipeline for object tracking, object and lens position estimation and lens position prediction;
more accurate prediction for future frames;
stable focus in corner cases.
Effects of lens position estimation via disparity and reliability:
accurate lens position estimation via machine learning model;
precise focusing on tracked object;
smooth lens transition due to reliability estimation.
Effects of tracker optimization:
running time of the optimized predictive autofocus method decreased by about 15 times compared to the prior art.

Figure 3:
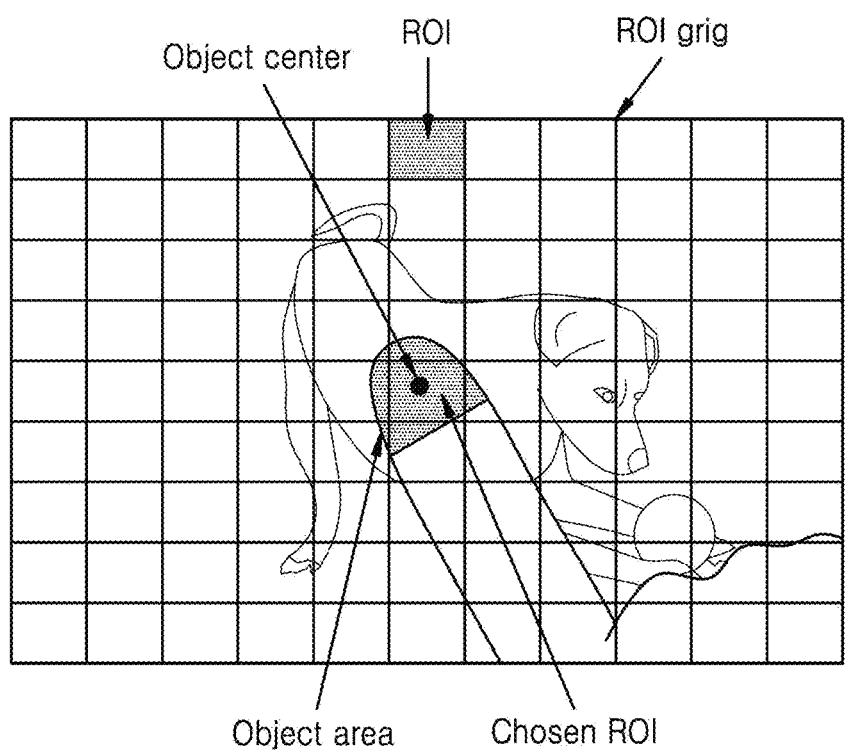
FIG. 3 is a schematic view of a device screen image in the process of tracking the object to focus on according to an embodiment of the disclosure.

FIG. 3 is a schematic view of a device screen image in the process of tracking the object to focus on according to an embodiment of the disclosure.

Figure 4:
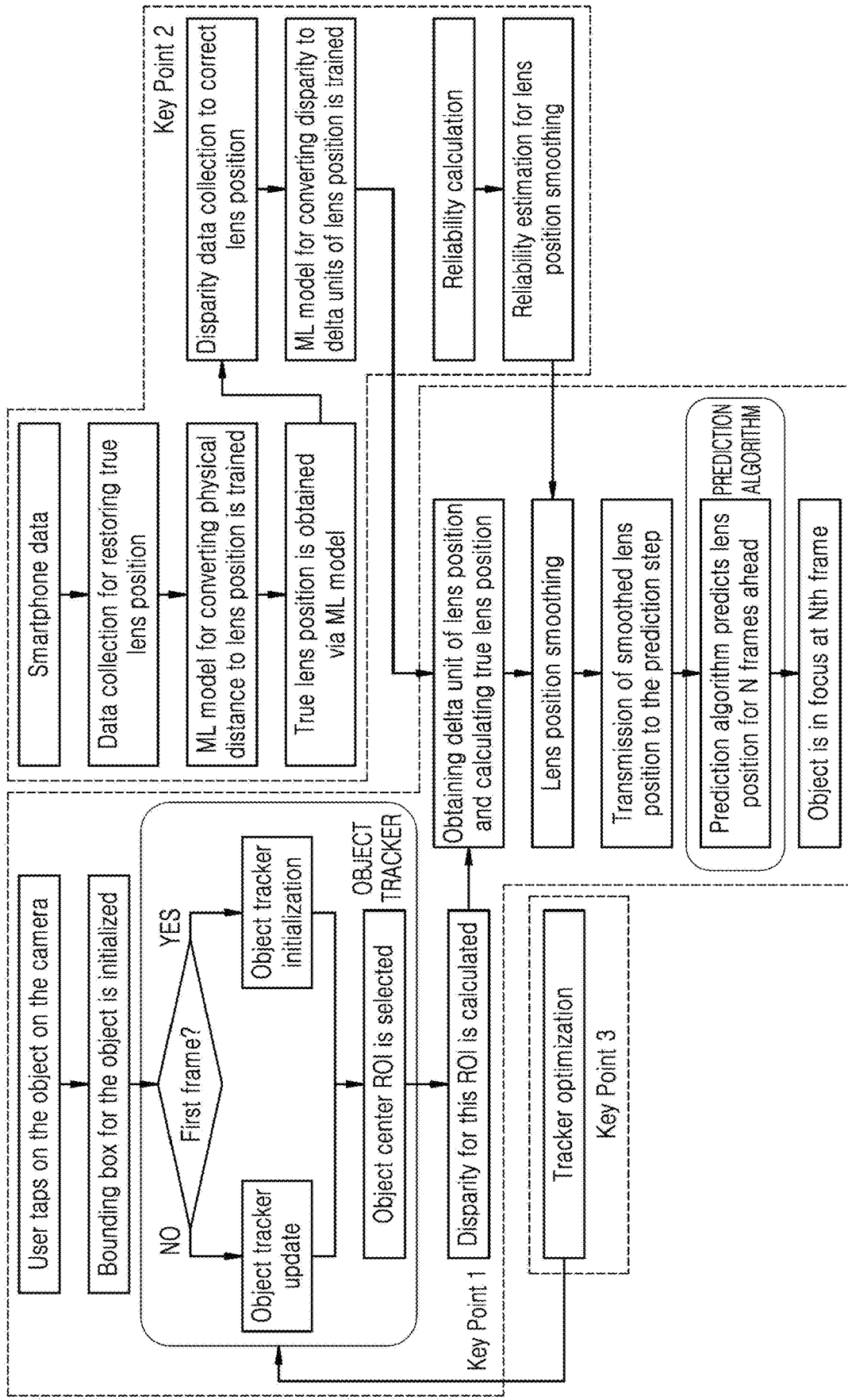
FIG. 4 is a flow diagram a method of predictive autofocus on an object according to an embodiment of the disclosure.

FIG. 4 is a flow diagram a method of predictive autofocus on an object according to an embodiment of the disclosure.

In the following, full pipeline of the predictive autofocus method from receiving input to output of result according to the disclosure will be described with reference to FIG. 4, which shows a flow diagram of the present method.

Figure 5A:
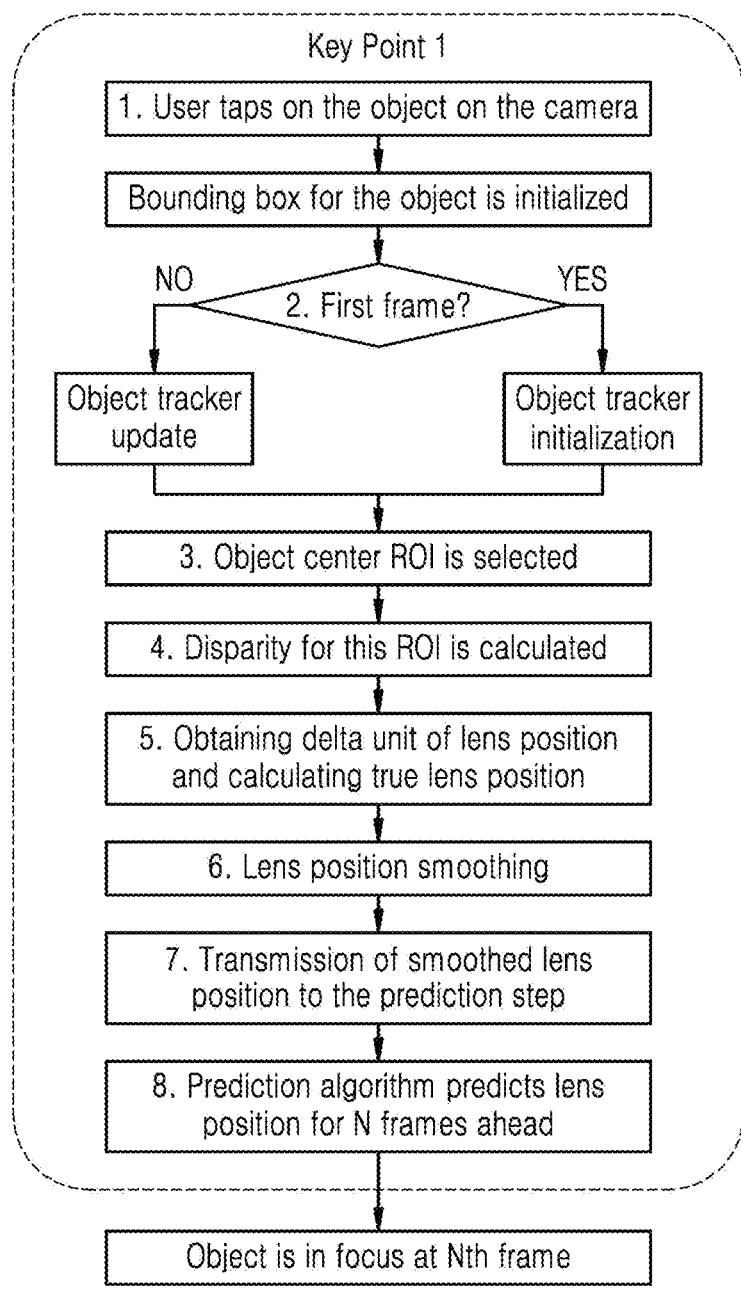
FIG. 5A is a partial flow diagram of FIG. 4, showing Key Point 1 of the predictive autofocus method according to an embodiment of the disclosure.

FIG. 5A is a partial flow diagram of FIG. 4, showing Key Point 1 of the predictive autofocus method according to an embodiment of the disclosure.

Figure 5B:
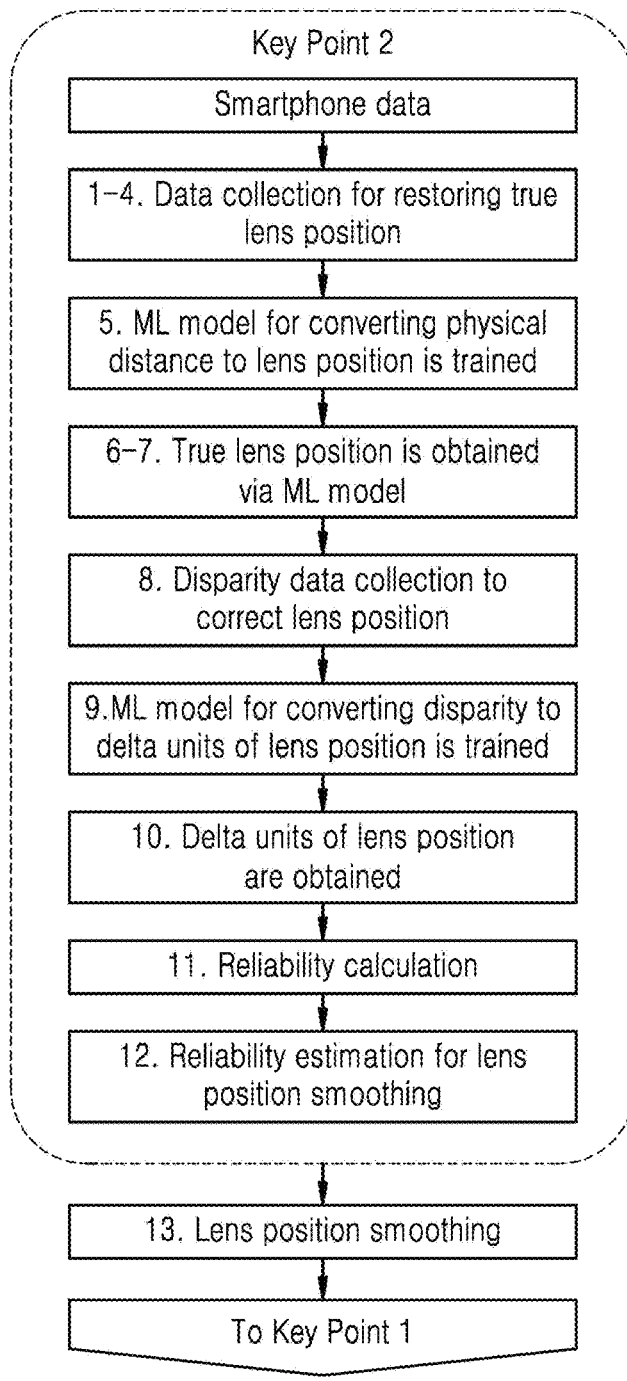
FIG. 5B is a partial flow diagram of FIG. 4, showing Key Point 2 of the predictive autofocus method according to an embodiment of the disclosure.

FIG. 5B is a partial flow diagram of FIG. 4, showing Key Point 2 of the predictive autofocus method according to an embodiment of the disclosure.

Figure 5C:
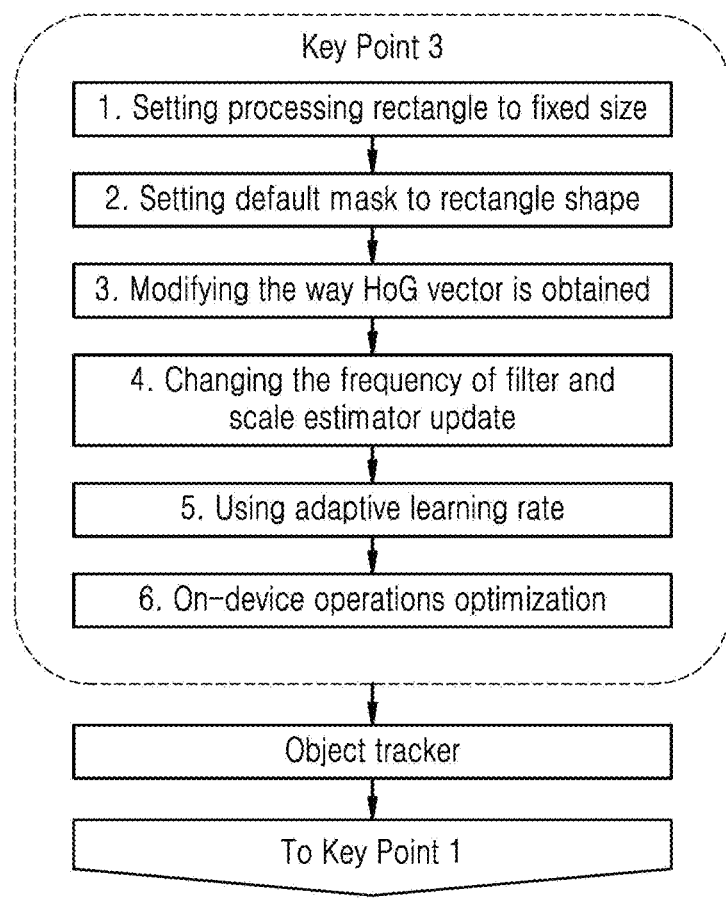
FIG. 5C is a partial flow diagram of FIG. 4, showing Key Point 3 of the predictive autofocus method according to an embodiment of the disclosure.

FIG. 5C is a partial flow diagram of FIG. 4, showing Key Point 3 of the predictive autofocus method according to an embodiment of the disclosure.

Key Point 1 (referring to FIGS. 4 and 5A)

Input to initialize the present method:
image, containing a target object, obtained from a camera incorporated in the device;
area selected by the user via I/O interface of the predictive autofocus device. By way of example and not limitation, the disclosure uses "grid" option of the Android smartphone camera app;
PDAF image data for calculating disparity, obtained by PDAF sensors on the device's camera matrix. As an example and not limitation, Dual Pixel technique can be used, where each pixel of the device's camera sensor is provided with a PDAF sensor. In addition, optionally, image depth information obtained by other conventional autofocus methods, for example, phase detection and stereo reconstruction, can be used as input.

Output of the present method:

$x_i, y_i$—ROI coordinates corresponding to target point that sets the center of bounding box for the target object contour at i-th frame;

$D_i$—disparity corresponding to ROI with $(x_i, y_i)$ coordinates;

$L_{i+n}$—lens position at $(i+n)^{th}$ frame, where n is the number of predicted frames; it should be explained that i-th frame is input, and lens position is predicted for n frames ahead, while prediction is displayed in the frame numbered i+n.

Next, the method algorithm will be described according to boxes in FIGS. 4 and 5A (Key Point 1):

1) At the first frame, user initiates tracker by tapping the target object on the device screen to set the object target point.

2) Tracker, using the device's central processing unit (CPU), tracks target object position for each frame.

3) At the first frame, user sets ROI by selecting the object target point. At all subsequent frames, ROI containing the object target point with $(x_i, y_i)$ coordinates is selected based on the tracker result.

4) Disparity ($D_i$) is calculated for ROI. Disparity is the local minimum point of SAD curve formed from PDAF data including left and right images obtained by PDAF sensors of the device camera matrix.

5) Current lens position is corrected using obtained disparity $D_i$ and data which will be explained in more detail in the description of Key Point 2. True lens position $L_i$ is calculated.

6) True lens position $L_i$ is smoothed via reliability described below in Key Point 2.

7) Smoothed lens position $L_i$ is used as input to prediction step using the device processor.

8) Lens position is predicted based on prediction step for N frames ahead, i.e., for (i+n)th frame. By way of a non-limiting example of this embodiment, prediction step can be based on Kalman filter, which estimates three quantities: lens position, speed, and acceleration in uniformly accelerated motion model.

The predicted autofocus method predicts lens position at (i+n)th frame, thereby ensuring that target object is in focus in real time.

Key Point 2 (referring to FIGS. 4 and 5B)

Disparity Correction for Lens Position Estimation

Input:

Device data—PDAF image data for calculating disparity, obtained from PDAF sensors on the device's camera matrix. By way of example but not limitation, Dual Pixel technique can be used, where each pixel of the device's camera matrix is provided with a PDAF sensor. Here, optionally, image depth information obtained by other prior art autofocus methods, for example, phase detection or stereo reconstruction, is used as input.

d—physical distance between device camera and target object;

$L_d$—lens position for the target object to be in focus estimated by device for distance d;

$D_k$—disparity corresponding to ROI with (x,y) coordinates for range of lens positions $(L_d-m, L_d+m)$, where {-m, m} is the range of lens positions, that guarantees that zero disparity will be achieved, and $k \in \{-m,+m\}$ is a value from the range, at which zero disparity is achieved. Disparity is determined as local minimum of SAD curve formed from image depth data, by way of example but not limitation, obtained by Dual Pixel technique or, optionally, by phase detection or stereo reconstruction.

Output:

$f: d \to L$—physical distance-to-lens position mapping MIL model (model f takes distance d as input and outputs lens position L);

$\varphi(D,L,x,y) \to \Delta$—disparity-to-delta lens position mapping MLg model (model $\varphi$ takes as input disparity D, and optionally, lens position L and target object position in frame (x, y) and outputs delta lens position $\Delta$).

In the following, algorithm of the method according to blocks in FIGS. 4 and 5B (Key Point 2) will be described.

1) Target object is set at distance d.

2) Disparity D is estimated for lens position in range $(L_d-m, L_d+m)$.

3) True lens position $\hat{L}_d = L_d - p$ is calculated, where p is lens position of which zero or close to zero disparity is achieved, for which a correction is made.

4) Steps 1 to 3 define process for obtaining data, according to which the value of distance d from target object to camera corresponds to value of lens position $L_d$, and are repeated for $d \in \{a,b\}$, where a and b are numbers corresponding to minimum and maximum distances from target object to the camera.

The collected data defining correspondence of distance d and lens position L are used to train machine learning model.

5) Physical distance-to-lens position mapping ML model, trained on collected d and $L_d$ data, maps arbitrary distance z from {a,b} range from target object to the device camera to true lens position L. It should be noted that the physical distance-to-lens position mapping ML model is trained prior to tracking a moving target object.

6) Camera lens of the device is then set to arbitrary position $L_{fixed}$ from $\{L_a, L_b\}$ range, and target object is moved from point a to point b.

7) For each $d \in \{a,b\}$, true lens position Lj is obtained via step 5.

8) For each value of d, delta lens position is estimated as $\Delta_d = \hat{L}_d - L_d$, where $\hat{L}_d$ is true lens position for distance d; $L_d$ is lens position for target object to be in focus, determined by the device for distance d. Here, delta lens position is a function of disparity D, and, optionally, current lens position L and (x, y) position at frame.

9) ML model for mapping disparity $D_d$ for distance d, i.e., corresponding to ROI at distance d, to $\Delta_d$ delta lens position is trained on the collected data. It should be noted that the ML model is trained before tracking the moving target. As a result, a disparity-to-delta lens position mapping ML model was obtained.

10) ML model obtained in step 9 estimates delta lens position $\Delta D$ based on disparity D.

Smoothing lens position via reliability estimation:

Input:

$\check{L}_i$—lens position for target object to be in focus, determined by the device for i-th frame;

$\hat{L}_i$—true target object position at i-th frame, $SAD_i$—SAD curves for i-th frame for ROI with x,y coordinates. SAD (Sum of Absolute Differences) used to plot the curves is calculated as absolute difference between pixels of left and right images from PDAF data. Curves are generated via a certain number of shifts of one image relative to the other.

Output:
R_i—reliability for i-th frame, a measurement indicating the degree to which the obtained lens position is affected by noise and, therefore, can be depended on to be accurate.
$\tilde{L}_i$—smoothed lens position at i-th frame.

Hereinafter, the algorithm of the method will be described according to blocks in FIG. 5B (Key Point 2):

11) By way of example and not limitation, reliability can be estimated as the signal-to-noise ratio, which estimates how much noise affects the data and which is a dimensionless quantity. For purposes of the disclosure, the signal-to-noise ratio can be approximated using two SAD curve minimums—global minimum and sub-minimum:

$$R = 100 \times \frac{Y_S}{Y_N} \cong \frac{Y_{sub} - Y_{min}}{Y_{min}} \quad \text{Equation 2}$$

where $Y_s$ is the signal level, $Y_n$—is the noise level, $Y_{min}$ is the global minimum and b is the sub-minimum. Equation 2) defines approximation of the signal-to-noise ratio using global minimum and sub-minimum of the SAD curve. Alternatively, reliability estimation can be performed by a machine learning model trained on SAD curves and additional features that ensure estimation of noise level in the data obtained. In this case, loss function for the machine learning model should consider the difference between estimated lens position and earlier defined lens position for physical distance d (Ld) (see Key Point 1).

12) Using reliability R and data, specifically, disparity D and delta lens position Δd from steps 10 and 11 of Key Point 2, true lens position obtained in step 5 of Key Point 1 is denoised to smoothed lens position $\tilde{L}_i$ at i-th frame in operation 13). Smoothed lens position $\tilde{L}_i$ is defined as a function of current and previous true lens position values $\{\tilde{L}_1, \tilde{L}_2 \ldots \tilde{L}_i\}$ and their respective reliability estimates $\{R_1, R_2 \ldots R_i\}$. By way of example and not limitation, weighted sum of previous true values can be used, where reliability estimations are used as weights.

The steps disclosed in Key Point 2 provide estimation of delta lens position to correct lens position, and smoothing lens position at i-th frame.

Key point 3
Tracker optimization
Input:
CFT—tracker based on correlation filters.
Output:
CFT—optimized tracker based on correlation filters.

In the following, tracker optimization steps will be described according to flow diagram in FIG. 5C (Key Point 3).

1) Setting processing matrix of pixel blocks (processing region) to fixed size.

Each frame of the image is viewed as pixels or a group of pixels. According to the tracker, in step 1, pixels are grouped into rectangular pixel blocks constituting a matrix of pixel blocks. To reduce the amount of computation in the subsequent optimization steps, the matrix of pixel blocks has a fixed size, regardless of changes in the target object size during shooting. Processing region is a region corresponding to the matrix of pixel blocks in the image, which that is of the same size or larger than the ROI. As a result, two selected rectangular regions in the image are considered: region of interest ROI and processing region that encloses it. After setting the processing region, each included block of pixels is associated with a set of features. By way of example and not limitation, the disclosure uses two features: brightness of pixels in the block of pixels and histogram of gradients for the block of pixels, formation of which is disclosed below. Key property of these features is representation of changes in the processing region, i.e., changing the values as such in pixel blocks due to movement of the target object.

2) Setting Binary Mask for Correlation Filters.

When generating correlation filters for tracking target objects, masks are used, which being superimposed on the region of interest cut off from consideration some pixel blocks, presumably not belonging to the object. By way of example and not limitation, the disclosure uses a binary mask with value 1 for pixel blocks corresponding to ROI within a processing region and value 0 for pixel blocks outside the ROI. This type of mask does not require intermediate calculations, which accelerates processing of this step. An alternative example is a mask in the form of a two-dimensional normal density function with center in target point. In addition, a related art publication describes an example of a mask calculated from brightness of mask pixels with values in the range from 0 to 1.

3) Modifying the way of generating histogram of oriented gradients (HoG).

In conventional image processing, histogram of oriented gradients (HoG) is widely used as a feature characterizing a block of pixels. Originally, the method of HoG generation is described in a related art publication'; hereinafter modified details of generation and modification of the histogram (HoG) are described.

a) In the disclosure, histogram is computed from grayscale representation of the image instead of using RGB to reduce the amount of computation; b) Gradient histogram is presented as a list of values, each corresponding to a direction (degree) on a predetermined division of 360 degrees into sectors. Modification according to the disclosure includes the following: next value of gradient length that falls into a division sector, for a certain position in the block of pixels, does not fill one nearest predetermined direction, but is distributed between two adjacent directions in a size directly proportional to the cosine of the angle between respective direction and the gradient processed; c) obtained values for histogram in certain block are extrapolated to neighboring pixel blocks in size, which is dependent for each value on distance of respective pixel of the block of pixels to the neighboring block of pixels.

The use of histogram of oriented gradients (HoG), specifically, in steps b and c, provides smoother representation of target object movement from frame to frame.

4) Changing the frequency of correlation filter update for determining the object center (target point) and the correlation filter for determining the size of ROI.

As stated before, correlation filter is preliminary formed based on the user-selected first frame of the target object that is in whole or in part in the camera's field of view. The target object tracker includes a step of determining current ROI size, which changes with the object shape and position relative to the camera. This step is also implemented via a correlation filter: one-dimensional map of the signal is generated in the form of a list of values, where each coordinate value represents the region of interest size from a predetermined set of trial sizes. The set of trial sizes is formed relative to current one by multiplying by a factor, for example [0.5×, 0.7×, 1.0×, 1.2×, 1.5×]. Optimal size, including the object of interest, taking into account the change in the shape and position of the object relative to the camera, is selected by coordinate with maximum value. Thus, two different in structure correlation filters: a filter for determining target point on a new frame and a filter for determining optimal region of interest on a new frame are used at the tracker. The correlation filters is not calculated on every frame: the filter for determining object center is calculated once in a series of N frames, the filter for determining region of interest size is built once in a series of M frames. Values of frames N and M are set parametrically: by way of example but not limitation, N and M can be 3. Using a change in the update frequency of the filter for determining object center (target point) and the filter for determining region of interest size, acceleration is provided on average for the sequence of images, since this step is merely omitted at some frames.

5) Adaptive changing of correlation filter weight for determining object center position (target point).

When combining the correlation filter from previous frame defining the target point with precedent filter on current frame, weight factor (hereinafter, weight) is adaptive, i.e., may vary from frame to frame depending on the observed ROI. Initially, from the first frame, the weight (magnitude taking value from 0 to 1) is very small, for example, 0.01. At the instant of sharp change in the region of interest, recognized by metric of sum of absolute differences (SAD) of pixels in processing regions), the weight becomes equal to 1, which simulates erasing history from previous frames and initializing the filter from zero. This metric is traditionally used to compare images; in particular, here two image regions, corresponding to the processing region, presented in the form of matrices, are compared pixel by pixel. For example, for n×m matrixes SAD metric is:

$$SAD = \Sigma_{i=1}^{n} \Sigma_{j=1}^{m} |R_{ij}^{current} - R_{ij}^{previous}| \qquad \text{Equation 3}$$

where $R^{current}$ is the processing region from current frame, $R^{previous}$ is the processing region from previous frame, n, m are sizes of the processing region, i, j are coordinates of the pixel block in the matrix.

6) Using accelerated matrix operations: complex matrix point-wise multiplication and Fourier transform.

Both types of operations are used in calculation of correlation filters and features for pixel blocks. In terms of the disclosure, acceleration is achieved via the use of vector operations. In addition, the Fourier transform algorithm, often implemented as a Cooley-Tukey fast Fourier transform (FFT) described in a related art publication, has been modified for more optimal work on fixed matrix sizes due to fixed size of the processing region.

As a result of Key Point 3, tracker running time for target object for predicted autofocus is decreased by about 15 times compared to a related art example.

The disclosure provides using a device for predictive autofocus on an object with the following features:

1) Process of tracking a moving object and keeping it in focus is steady and stable during observation.

2) Keeping fast-moving target objects in focus on the device screen is enabled by predicting target object position and lens position for several frames ahead.

3) Method of predictive autofocus on an object according to the disclosure is stable in corner or critical cases, such as partial occlusion of the observed scene with the target object, color coincidence of target object and background, resulting in low scene contrast, low-light shooting.

4) Auto-focusing on the target object and displaying on the device screen of the focused photo or video image of the object are provided in real time.

5) The predicted autofocus method requires smaller computational resources on the device for data processing.

Description of the Device:

A device for predictive autofocus on an object will now be described with reference to FIG. 6. The device according to the disclosure is a compact, portable device (optionally, on Android, iOS, etc.), comprising:

central processing unit with one or more cores;
graphics processing unit;
system memory;
memory controller to control data flow to and from system memory;
one or more cameras, optionally provided with a phase detection autofocus (PDAF) sensor or sensors;
touch screen;
I/O interfaces to receive information from various sensors and output information. Examples of sensors include a display sensor and a camera matrix sensor;
storage such as a solid state drive (SSD).

The predictive autofocus device can be incorporated into smartphones and tablet computers running Android, iOS, HarmonyOS and similar operating systems, and other devices of that kind, which need predicted autofocus on an object.

Figure 6:
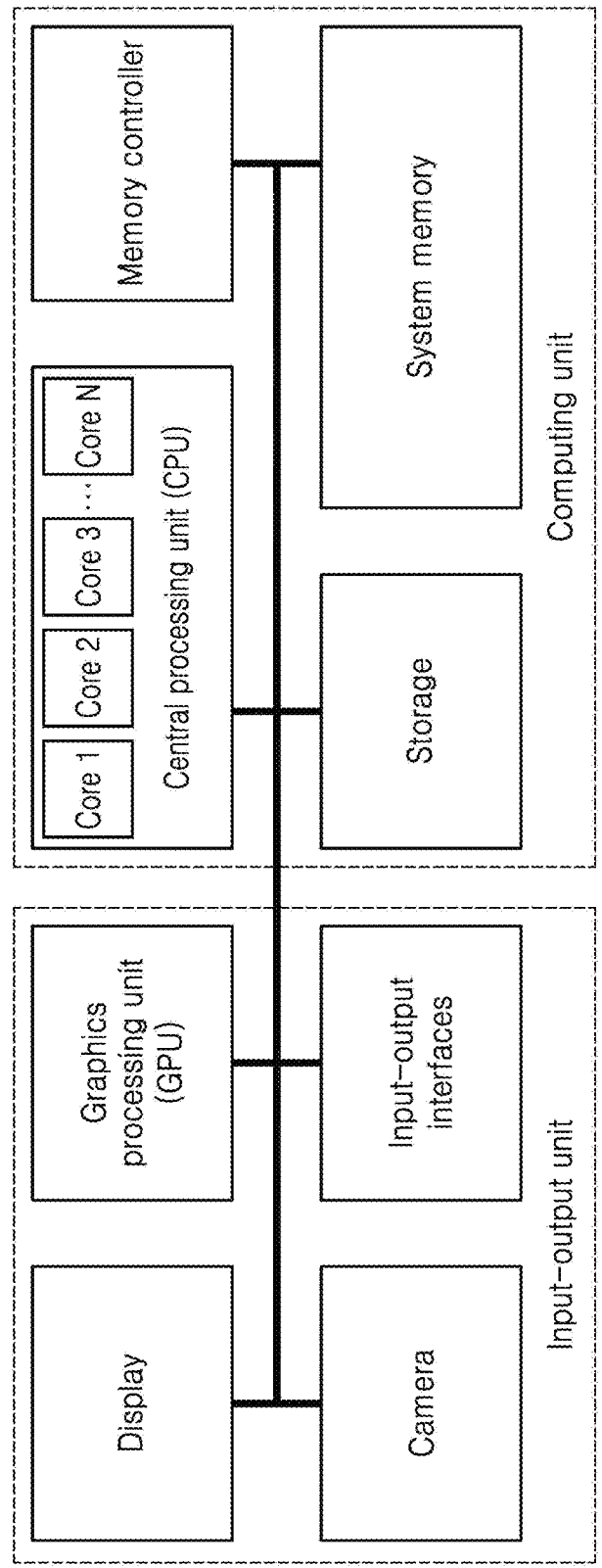
FIG. 6 is a schematic diagram of a device for predictive autofocus on an object according to an embodiment of the disclosure.

Referring to FIG. 6, principle of operation of the device for predictive autofocus on an object according will be described.

1. In the process of photo or video shooting, light rays reflected from the target object pass via a lens of camera or cameras of the predictive autofocus device and fall onto the camera matrix.

2. Data received from the matrix (optionally, using PDAF sensors) is sent via I/O interface to system memory of the computing unit.

3. User taps on the device screen. Information on tap point received by a pressure sensor disposed under the display is sent via the I/O interface to the system memory.

4. From the data obtained in items 2 and 3, the predicted autofocus method, using the central processor and the memory controller of the device, predicts lens position for N frames ahead.

5. The predicted lens position is transferred to the device camera via the system memory and I/O interface for autofocusing.

6. Graphic information from the device camera is transferred via I/O interface and graphics processing unit to the device screen.

7. User observes finding the target object of interest in focus in real time. Optionally, photo and video shooting results are saved to the device's storage.

Therefore, internal circuit of the device comprises two functional units:

1. Computing unit: central processor, memory controller, system memory and storage.

2. I/O unit: graphics processing unit, display, camera, I/O interface.

Computing unit tracks the object, determines current lens position to find the object in focus via machine learning models, and predicts object and lens positions for future frames. I/O unit receives input and focuses the device lens and outputs the target object image to the device screen.

FIG. 7 is a flow diagram of the predicted autofocus method according to an embodiment of the disclosure.

A predictive autofocus device may capture an image of a target object to be tracked by a user of camera of a predictive autofocus device (S710).

A predictive autofocus device may select a region of interest (ROI) corresponding to a user-selected target point of the captured image of the target object (S720).

A predictive autofocus device may initialize a target object tracker via input defining $(x_i, y_i)$ coordinates of the selected ROI at an i-th frame (S730).

In here, the i can be 1 (i=1), and a predictive autofocus device may update the target object tracker based on data received at the tracker at a previous (i−1)th frame of the i-th frame, where i>1.

A predictive autofocus device may determine a current camera lens position for the tracked target object at a current frame, when the target object is out of a camera focus (S740).

A predictive autofocus device may determine disparity (Di) for the selected ROI at the i-th frame from previously collected data defining a dependence of distance between the target object and a lens surface on the camera lens position (S750).

A predictive autofocus device may determine a delta lens position to focus the camera on the target object as a function of disparity (Di) and a current lens position or target object position in the frame by a computing unit of the predictive autofocus device (S760).

A predictive autofocus device may calculate a predicted target object position and delta lens position of the camera for N future frames from $(x_i, y_i)$ coordinates of current ROI and current delta lens position for the target object and providing predicted autofocus in real time by the computing unit (S770).

The predictive autofocus device and method can be used in compact, portable devices, such as tablet computers, notebooks, teleconferencing systems; in addition, they can be used for photo and video shooting with cameras of smartphones on Android, iOS, HarmonyOS, and similar operating systems, and in other devices which need predicted autofocus.

While the disclosure has been shown and described with reference to various embodiments thereof, it will be understood by those skilled in the art that various changes in form and details may be made therein without departing from the spirit and scope of the disclosure as defined by the appended claims and their equivalents.

In accordance with an aspect of the disclosure, a method of predictive autofocus on an object is provided. The method includes capturing an image of a target object to be tracked by a user of camera of a predictive autofocus device, selecting a region of interest (ROI) corresponding to a user-selected target point of the captured image of the target object, initializing a target object tracker via input defining $(x_i, y_i)$ coordinates of the selected ROI at i-th frame, where i=1, and updating the target object tracker based on data received at the tracker at previous (i−1)th frame for i-th frame, where i>1, determining current camera lens position for the tracked target object at current frame, when the target object is out of the camera focus, determining disparity (Di) for the selected ROI at i-th frame from previously collected data defining the dependence of distance between the target object and the lens surface on the camera lens position, determining delta lens position to focus the camera on the target object as a function of disparity (Di) and current lens position or target object position in the frame by a computing unit of the predictive autofocus device, calculating predicted target object position and delta lens position for N future frames from $(x_i, y_i)$ coordinates of current ROI and current delta lens position for the target object and providing predicted autofocus in real time by the computing unit.

Furthermore, the determining of delta lens position to focus the camera on the target object as a function of disparity (Di) and current lens position or target object position in the frame is performed by a trained disparity-to-delta lens position mapping machine learning (ML) model and a trained physical distance-to-lens position mapping machine learning model, both the disparity-to-delta lens position mapping machine learning model and the trained physical distance-to-lens position mapping machine learning model being implemented in the computing unit.

It should be noted that the physical distance-to-lens position mapping ML model, implemented in the computing unit, is trained prior to the target object tracker, and the physical distance-to-lens position mapping ML model is trained on previously collected data defining different distances (d) from the camera to the target object, corresponding to lens position values $(L_d)$ for de {a,b}, where a, b are the values corresponding to minimum and maximum distance from the target object to the camera.

The delta lens position is a difference between a fixed lens position and a position obtained for the distance.

Moreover, the disparity-to-delta lens position mapping ML model, implemented in the computing unit, is trained prior to the target object tracker, and the disparity-to-delta lens position mapping ML model, implemented in the computing unit, is trained on previously collected data defining different camera distances (d) to the target object, corresponding to lens position values $(L_d)$ and disparity values $D_d$ for distance d, corresponding to ROI at distance d for d∈{a,b}, where a, b are the values corresponding to minimum and maximum distance from the target object to the camera.

Moreover, a disparity value (Di) for selected ROI at the i-th frame is determined from phase detection autofocus (PDAF) data obtained by a camera sensor matrix of the predictive autofocus device as a local minimum of a sum of absolute differences (SAD) curve.

It should be noted that the determining of the disparity value (Di) for the selected ROI at the i-th frame from obtained PDAF data representing right and left images of the target object, obtained by the camera sensor matrix, includes calculating a sum of absolute differences as absolute difference between pixels of left and right images, based on which SAD curves are plotted.

The method further comprises determining reliability for correcting the lens position at which the target object is in focus.

Furthermore, reliability is determined as a signal-to-noise ratio from an expression, $$R = 100 x^{\frac{Y_S}{Y_N}}, \qquad \text{Equation 1}$$

where R is reliability, $Y_S$ is signal level, and $Y_N$ is noise level.

In addition, reliability is determined via a machine learning model from SAD curves and features defining lens position.

The method further comprises generating a correlation filter for determining the object target point changing with the shape and position of the target object relative to the camera, and a correlation filter for determining the ROI size changing with the shape and position of the target object relative to the camera.

Furthermore, said step of determining current camera lens position for the tracked target object at current frame comprises using the correlation filter for determining the object target point and the correlation filter for determining the size of the region of interest, and the correlation filter for determining the object target point is used once for N frames, and the correlation filter for determining the size of the region of interest is used once for M frames, where M and N values can be equal or different.

The method according to the first aspect of the disclosure further comprises providing a binary mask when generating a correlation filter for determining the object target point and a correlation filter for determining the size of the region of interest.

In addition, the method further comprises generating a histogram of oriented gradients (HoG) when calculating a correlation filter for determining the object target point and a correlation filter for determining the size of a region of interest, and said generating of a histogram of oriented gradients (HoG) is performed based on a grayscale representation of the image.

The method further comprises providing a weight for correcting the correlation filter for determining the object target point depending on current ROI.

The method further comprises extrapolating obtained histogram values for a certain block to a neighboring block in a size dependent, for each value, on a distance of a corresponding pixel of the certain block to the neighboring block.

The HoG is presented as a list of values, each corresponding to a direction on a predetermined division of 360 degrees into sectors.

The method further comprises extracting pixel-wise or block-wise features from the region of interest. In accordance with another aspect of the disclosure, a device for predictive autofocus on an object, operable to perform the method steps disclosed above according to the first aspect of the disclosure is provided. The device includes an input/output (I/O) unit including a graphics processing unit, a display, a camera, and interfaces, a computing unit including a central processor, a controller, a memory, a system memory and storage, wherein the camera comprises a matrix of sensors and is configured to capture a target object and transfer image data of the target object to the system memory of the computing unit via the I/O interface, the computing unit is configured to calculate target object position and delta lens position of the camera predicted for N future frames, the resulting target object position being transferred to the system memory and via the I/O interface to the camera for auto-focusing, the camera is configured to transfer graphic information based on calculated data of the predicted target object position via the I/O interface and the graphics processing unit to the device display, and the device display is configured to render the target object being in focus in real time.

Furthermore, the graphics processing unit is configured to process graphic information received from the device camera.

In the device for predicted autofocus the matrix of sensors is a matrix of PDAF sensors, and the storage is configured to store photo and video images obtained by the device camera.

Furthermore, the device for predicted autofocus on an object is adapted to be incorporated in one of a smartphone, a tablet computer, a photo and video camera.

Other aspects, advantages, and salient features of the disclosure will become apparent to those skilled in the art from the following detailed description, which, taken in conjunction with the annexed drawings, discloses various embodiments of the disclosure.

What is claimed is:

1. A method of predictive autofocus on an object, the method comprising:
   capturing an image of a target object to be tracked by a user of camera of a predictive autofocus device;
   selecting a region of interest (ROI) corresponding to a user-selected target point of the captured image of the target object;
   initializing a target object tracker via input defining $(x_i, y_i)$ coordinates of the selected ROI at an i-th frame, where i=1, and updating the target object tracker based on data received at the tracker at a previous (i−1)th frame of the i-th frame, where i>1;
   determining a current camera lens position for the tracked target object at a current frame, when the target object is out of a camera focus;
   determining disparity (Di) for the selected ROI at the i-th frame from previously collected data defining a dependence of distance between the target object and a lens surface on the camera lens position;
   determining a delta lens position to focus the camera on the target object as a function of disparity (Di) and a current lens position or target object position in the frame by a computing unit of the predictive autofocus device; and
   calculating a predicted target object position and delta lens position of the camera for N future frames from $(x_i, y_i)$ coordinates of current ROI and current delta lens position for the target object and providing predicted autofocus in real time by the computing unit.

2. The method of claim 1, wherein the determining of delta lens position to focus the camera on the target object as a function of disparity (Di) and current lens position or target object position in the frame is performed by a trained disparity-to-delta lens position mapping machine learning (ML) model and a trained physical distance-to-lens position mapping machine learning model, both the disparity-to-delta lens position mapping machine learning model and the trained physical distance-to-lens position mapping machine learning model being implemented in the computing unit.

3. The method of claim 2, wherein the physical distance-to-lens position mapping machine learning model, implemented in the computing unit, is trained prior to the target object tracker.

4. The method of claim 2, wherein the physical distance-to-lens position mapping machine learning model is trained on previously collected data defining different distances (d) from the camera to the target object, corresponding to lens position values ($L_d$) for d∈{a,b}, where {a,b} are values corresponding to a minimum and a maximum distance from the target object to the camera.

5. The method of claim 2, wherein the disparity-to-delta lens position mapping machine learning model, implemented in the computing unit, is trained prior to the target object tracker.

6. The method of claim 2, wherein the disparity-to-delta lens position mapping machine learning model, implemented in the computing unit, is trained on previously collected data defining different camera distances (d) to the target object, corresponding to lens position values ($L_d$) and disparity values $D_d$ for distance d, corresponding to ROI at distance d for d∈{a,b}, where {a,b} are values corresponding to a minimum and a maximum distance from the target object to the camera.

7. The method of claim 2, wherein the delta lens position is a difference between a fixed lens position and a position obtained for the distance.

8. The method of claim 1, wherein a disparity value (Di) for selected ROI at the i-th frame is determined from phase detection autofocus (PDAF) data obtained by a camera sensor matrix of the predictive autofocus device as a local minimum of a sum of absolute differences (SAD) curve.

9. The method of claim 8, wherein the determining of the disparity value (Di) for the selected ROI at the i-th frame from obtained PDAF data representing right and left images of the target object, obtained by the camera sensor matrix, includes calculating a sum of absolute differences as absolute difference between pixels of left and right images, based on which SAD curves are plotted.

10. The method of claim 1, further comprising determining reliability for correcting the lens position at which the target object is in focus.

11. The method of claim 10, wherein reliability is determined as a signal-to-noise ratio from an expression:

$$R = 100 x^{\frac{Y_S}{Y_N}},$$

where R is reliability, $Y_S$ is signal level, and $Y_N$ is noise level.

12. The method of claim 10, wherein reliability is determined via a machine learning model from sum of absolute differences (SAD) curves and features defining lens position.

13. The method of claim 1, further comprising generating a correlation filter for determining the object target point changing with a shape and position of the target object relative to the camera.

14. The method of claim 1, further comprising generating a correlation filter for determining an ROI size changing with a shape and position of the target object relative to the camera.

15. The method of claim 13, wherein the determining of current camera lens position for the tracked target object at current frame comprises using the correlation filter for determining the object target point and the correlation filter for determining a size of the ROI.

16. The method of claim 13, wherein the correlation filter for determining the object target point is used once for N frames, and the correlation filter for determining a size of the ROI is used once for M frames, where M and N can be equal to or different from each other.

17. The method of claim 13, further comprising providing a binary mask when generating a correlation filter for determining the object target point and a correlation filter for determining a size of the ROI.

18. The method of claim 13, further comprising generating a histogram of oriented gradients (HoG) when calculating a correlation filter for determining the object target point and a correlation filter for determining a size of the ROI.

19. The method of claim 18, wherein the generating of the HoG is performed based on a grayscale representation of the image.

20. A device for predictive autofocus on an object, the device comprising:
an input/output (I/O) unit including a graphics processing unit, a display, a camera, and an I/O interface; and
a computing unit including a central processor, a controller, a memory, a system memory, and storage,
wherein the computing unit is configured to:
capture an image of a target object to be tracked by a user of camera of a predictive autofocus device,
select a region of interest (ROI) corresponding to a user-selected target point of the captured image of the target object,
initialize a target object tracker via input defining ($x_i,y_i$) coordinates of the selected region of interest (ROI) at i-th frame, where i=1, and update the target object tracker based on data received at the tracker at previous (i−1)th frame for i-th frame, where i>1,
determine current camera lens position for the tracked target object at current frame, when the target object is out of a camera focus,
determine disparity (Di) for the selected ROI at i-th frame from previously collected data defining a dependence of distance between the target object and a lens surface on the camera lens position,
determine delta lens position to focus the camera on the target object as a function of disparity (Di) and current lens position or target object position in the frame by the computing unit of the predictive autofocus device, and
calculate predicted target object position and delta lens position of the camera for N future frames from ($x_i,y_i$) coordinates of current region of interest (ROI) and current delta lens position for the target object and providing predicted autofocus in real time by the computing unit,
wherein the camera comprises a matrix of sensors and is configured to capture a target object and transfer image data of the target object to the system memory of the computing unit via the I/O interface,
wherein the computing unit is further configured to calculate target object position and delta lens position of the camera predicted for N future frames, the calculated target object position being transferred to the system memory and via the I/O interface to the camera for auto-focusing,
wherein the camera is configured to transfer graphic information based on calculated data of the predicted target object position via the I/O interface and the graphics processing unit to the display of the device, and
wherein the display of the device is configured to render the target object being in focus in real time.

* * * * *